United States Patent [19]

Ingraham et al.

[11] Patent Number: 5,477,675
[45] Date of Patent: Dec. 26, 1995

[54] FLUID POWER ASSIST METHOD AND APPARATUS

[75] Inventors: Ronald D. Ingraham; John M. Washeleski, both of Reed City, Mich.

[73] Assignee: Nartron Corporation, Reed City, Mich.

[21] Appl. No.: 184,909

[22] Filed: Jan. 19, 1994

Related U.S. Application Data

[63] Continuation of Ser. No. 842,232, Feb. 26, 1992, abandoned, which is a continuation-in-part of Ser. No. 474,364, Feb. 2, 1990, abandoned, which is a continuation-in-part of Ser. No. 312,626, Feb. 17, 1989, abandoned.

[51] Int. Cl.$^6$ .............................. F04B 49/02; G01B 7/14
[52] U.S. Cl. .......................... 60/418; 180/132; 324/207.2; 324/207.24; 324/117 H; 324/207.11
[58] Field of Search .............................. 324/207.2, 207.24; 60/418; 180/132

[56] References Cited

U.S. PATENT DOCUMENTS

| | | | |
|---|---|---|---|
| 3,214,609 | 10/1965 | Drew et al. | 324/117 H X |
| 3,226,640 | 12/1965 | Kuhrt et al. | 324/117 H |
| 3,311,820 | 3/1967 | Johnson | 324/226 |
| 3,680,026 | 7/1972 | Masuda et al. | 338/32 H |
| 3,891,918 | 6/1975 | Ellis | 324/207.24 |
| 3,976,158 | 8/1976 | Shaffer | 60/418 |
| 3,996,742 | 12/1976 | Goff | 60/445 |
| 4,223,694 | 9/1980 | Kervagoret | 60/418 |
| 4,278,403 | 7/1981 | Shafer | 60/418 |
| 4,295,118 | 10/1981 | Herr et al. | 324/251 |
| 4,355,280 | 10/1982 | Duzich | 324/207.24 |
| 4,471,304 | 9/1984 | Wolf | 324/208 |
| 4,616,188 | 10/1986 | Stitt et al. | 324/117 H X |
| 4,624,334 | 11/1986 | Kelledes et al. | 180/142 X |
| 4,639,665 | 1/1987 | Gary | 324/117 H |
| 4,660,671 | 4/1987 | Behr et al. | 180/142 |
| 4,692,703 | 9/1987 | Extance et al. | 324/117 H X |
| 4,745,811 | 5/1988 | Gray | 338/32 H |
| 4,846,048 | 7/1989 | Hvilsted et al. | 324/207.24 |
| 4,853,629 | 8/1989 | Rops | 324/208 |
| 4,855,625 | 8/1989 | Russell et al. | 324/307.24 |
| 4,855,675 | 8/1989 | Russell et al. | 324/207.24 |
| 4,856,339 | 8/1989 | Williams | 338/32 H |
| 4,857,824 | 8/1989 | Tew | 324/207.24 |

FOREIGN PATENT DOCUMENTS

| | | | |
|---|---|---|---|
| 172079 | 8/1986 | Japan | 324/251 |
| 377696 | 6/1973 | U.S.S.R. | 324/251 |
| 496498 | 3/1976 | U.S.S.R. | 324/251 |

OTHER PUBLICATIONS

Outboard Marine Corporation (OMC) service manual—a 34 page chapter entitled "Power Steering". Note particularly, on p. 9–4, entitled Description of Power Steering System.

Primary Examiner—Mitchell J. Hill
Attorney, Agent, or Firm—Watts, Hoffmann, Fisher & Heinke Co.

[57] ABSTRACT

An apparatus for driving a piston with fluid power is disclosed. The apparatus includes a fluid filled cylinder having an inner and an outer wall and defining a longitudinal axis. A piston is slidably positioned in the cylinder to move along a path of travel parallel to the longitudinal axis. A magnet is coupled to the piston for movement with the piston. The apparatus further includes a pump in fluid communication with the cylinder and being selectively actuated to intermittently pump pressurized fluid into the cylinder to apply force to and move the piston in a first direction along the path of travel. A fluid releasing apparatus is provided to release fluid from the cylinder to move the piston in a direction opposite the first direction. The apparatus also includes a Hall effect sensor situated at a location along the outer wall of the cylinder for sensing a position of the piston by sensing a magnetic field associated with the magnet at the location of the sensor. Control circuitry is coupled to an output from the Hall effect sensor for actuating the pump.

3 Claims, 8 Drawing Sheets

FLUID POWER ASSIST METHOD AND APPARATUS

REFERENCE TO RELATED APPLICATION

The present application is a continuation of application Ser. No. 07/842,232, filed Feb. 26, 1992, now abandoned, which was a continuation-in-part of application Ser. No. 07/474,364, filed Feb. 2, 1990, now abandoned, which was a continuation-in-part of application Ser. No. 07/312,626, filed Feb. 17, 1989, now abandoned.

1. Technical Field

The present invention relates generally to braking, power assisted steering and other hydraulic and pneumatic systems for automotive, marine, avionic and industrial use, and more specifically to a method and apparatus for intermittently actuating a pump for supplying operating pressure to such systems.

2. Background Art

Many types of hydraulic and pneumatic systems are known for use in automotive, marine, avionic, industrial and other environments. These types of systems employ a fluid under pressure (i.e., meaning either a gas or a liquid) to effect power-assisted motion.

In a typical known type of hydraulic power steering system, for example, a pump and reservoir assembly supply fluid under pressure to a spool valve and a steering cylinder assembly. The pump pressurizes the fluid and directs it to the steering cylinder via the spool valve. The steering cylinder and spool valve assembly control steering assist and direction, by governing the side of the cylinder piston to which the fluid under pressure is applied. Using the mechanical input from an operator's steering system, the spool valve directs pressurized fluid to the correct side of the steering cylinder piston. Connector rod apparatus coupled to the hydraulic cylinder piston rod transmits power assist to where it is needed.

Power steering systems employing hydraulics, corresponding to the above general description, have been commercially available for large outboard motors for several years from several sources, including Outboard Marine Corporation of Milwaukee, Wisc., U.S.A.

In such a system, pressurized hydraulic fluid is employed to apply force for effecting steering movement. An hydraulic pump that is driven continuously by the outboard motor, or by battery power, maintains pressure in the fluid. The system includes an accumulator wherein nitrogen gas under pressure is maintained. As the boat is operated and the operator uses the steering system, the gas pressure in the accumulator diminishes and a movable piston mounted within the accumulator responds to this reduced pressure by moving within the unit.

The accumulator was proposed as a buffer for the fluid pressure, and was to facilitate the use of a smaller pump then would otherwise be required. With the accumulator, the pump could be spaced close to that required to do the average amount of work required. Without the accumulator, the pump had to be spaced to meet peak demand.

Movement of a hydraulic cylinder piston (as opposed to an accumulator piston) has in the prior art been sensed by a contact sensing switch.

The use of a mechanical contact for monitoring movement of the piston shortens the useful life of the system due to wear and erosion of the mechanical contact. This is especially true due to the frequency of the repetitive piston movement back and forth against the switching contact.

Electrical position sensing of relatively movable components has been accomplished by the use of Hall effect devices. In such an arrangement, a magnet is mounted on one of the components. The other component carries a Hall sensor including an active face. The output of the Hall sensor varies in analog fashion with the amount of magnetic flux passing through the active face in one direction.

Two geometries of movement of such sensors are known. In a first geometry, known as a "head-on" sensor, a bar magnet is aligned for movement toward and away from the active face of the Hall sensor. At one extreme of its movement, the pole piece of the magnet substantially impinges upon the active face. As the magnet is moved in head-on fashion toward and away from the active face, the output of the Hall sensor element increases and decreases respectively, in analog fashion. One can obtain a reading of the relative spacing between the magnet and the active face by measuring this analog output.

"Head-on" Hall sensors are not known for great accuracy of position indication. To obtain a reliable, readable output change indicating a position change requires a relative movement, in practice, of between ⅛ and ¼ of an inch.

Somewhat greater position indication sensitivity has been obtained by the use of a Hall effect device having a different geometry. Such devices are known as "slide-by" detectors. In a slide-by detector, the magnet moves in a direction substantially parallel to the surface of the active face of the Hall element, such that it can "slide by" the device. As in the case of the "head-on" detector, position information is produced in the form of an analog varying electrical output signal from the Hall element.

While slide-by detectors have generally been superior to head-on detectors in sensitivity and accuracy of position indication, there is still room for improvement. In practice, a slid-by detector can achieve reliable, readable change of position information in response to displacements in the neighborhood of 1/16 inch to ⅛ inch.

It has been proposed, in a non-automotive environment, to monitor the position of a piston within a hydraulic cylinder by the use of magnetically actuable switches. In such a proposal, the cylinder has a wall made of non-ferro magnetic material. The piston is made of a ferro-magnetic material. A magnetically actuable reed switch is located external to the wall of the cylinder. As the ferro-magnetic piston approaches the reed switch, a magnet on the actuating member of the reed switch is attracted to the ferro-magnetic piston, and the switch is actuated, which provides an indication of roughly where the piston is located at the time of actuation.

This device, however, is rather crude in nature, because it lacks good resolution of the displacement of the piston. Likewise, it lacks repeatability in its operating characteristics.

It has also been proposed in hydraulic brake systems to monitor piston position within the master cylinder by means of contact switches located within the cylinder itself. The use of such interior switches, however, required the use of electrical leads passing through the wall of the master cylinder to electrical indication and monitoring equipment located external to the cylinder. This requirement created significant problems of sealing against the high pressure of the hydraulic fluid within the braking system, including within the master cylinder. Also, the discontinuities (such as holes, slots or recesses) which are required in the master cylinder wall tend to detract from the mechanical integrity of the master cylinder, which must often bear very high fluid

DISCLOSURE OF INVENTION

The present invention concerns a mechanism for increasing the life of a sensor used in cyclically activating a power steering hydraulic pump. A system constructed in accordance with the invention has a sensor for sensing movement of a pressure sensitive element within the power steering unit. The sensor provides a signal output which activates a pressure source that recharges the power steering unit. Latching drive circuitry coupled to the signal output from the sensor activates the pressure source and thereby increases the pressure within a pressure accumulator until the sensor output changes state, indicating a movement of the pressure sensitive element in response to pressure source activation.

A timing circuit coupled to an output from the latch monitors the amount of time the pressure source is activated. This circuit automatically de-activates the pressure source in the event a longer than adequate time period has elapsed since the pressure source is activated.

An additional feature of the invention is the technique used to sense pressure variation in the accumulator. A Hall sensor has an active face that is mounted perpendicular to the path of travel of a magnet that moves within the accumulator as the pressure changes. The flux of the magnet only triggers the Hall device as it reaches a point near the Hall sensor active face. The triggering is very accurate and not significantly dependant on the gap or spacing between the Hall sensor and the magnet.

In accordance with the preferred design the pressure source is an electric motor for a power steering hydraulic pump. The motor is activated and de-activated in response to Hall sensor output and in particular, the Hall sensor is utilized to monitor the movement of a piston whose position within the power steering unit depends on accumulator pressure. If the pressure within the accumulator drops to a specified value, the piston moves to a certain position. The Hall sensor output triggers motor activation which increases the pressure within the hydraulic fluid and, in turn, if this pressure increase is not sensed by the Hall device within a time period defined by the timing circuit, the motor is de-activated.

In the event of a failure by the power steering pump to repressurize the hydraulic fluid in response to the Hall sensor output, the user must toggle a power switch on and off to reset the system. If this does not produce a favorable result, i.e., the pressure within the power steering fluid and accumulator is still not sufficiently increased, the timing circuit will again de-activate the power steering unit.

One object of the invention is a hydraulic automotive or marine system having a non-contact sensor for monitoring the position of a movable pressure responsive piston within a cylinder. This and other objects, advantages and features of the invention will become better understood from a detailed description of the preferred embodiment of the invention which is described in conjunction with the accompanying drawings.

BEST MODE FOR CARRYING OUT THE INVENTION

Figure 1:
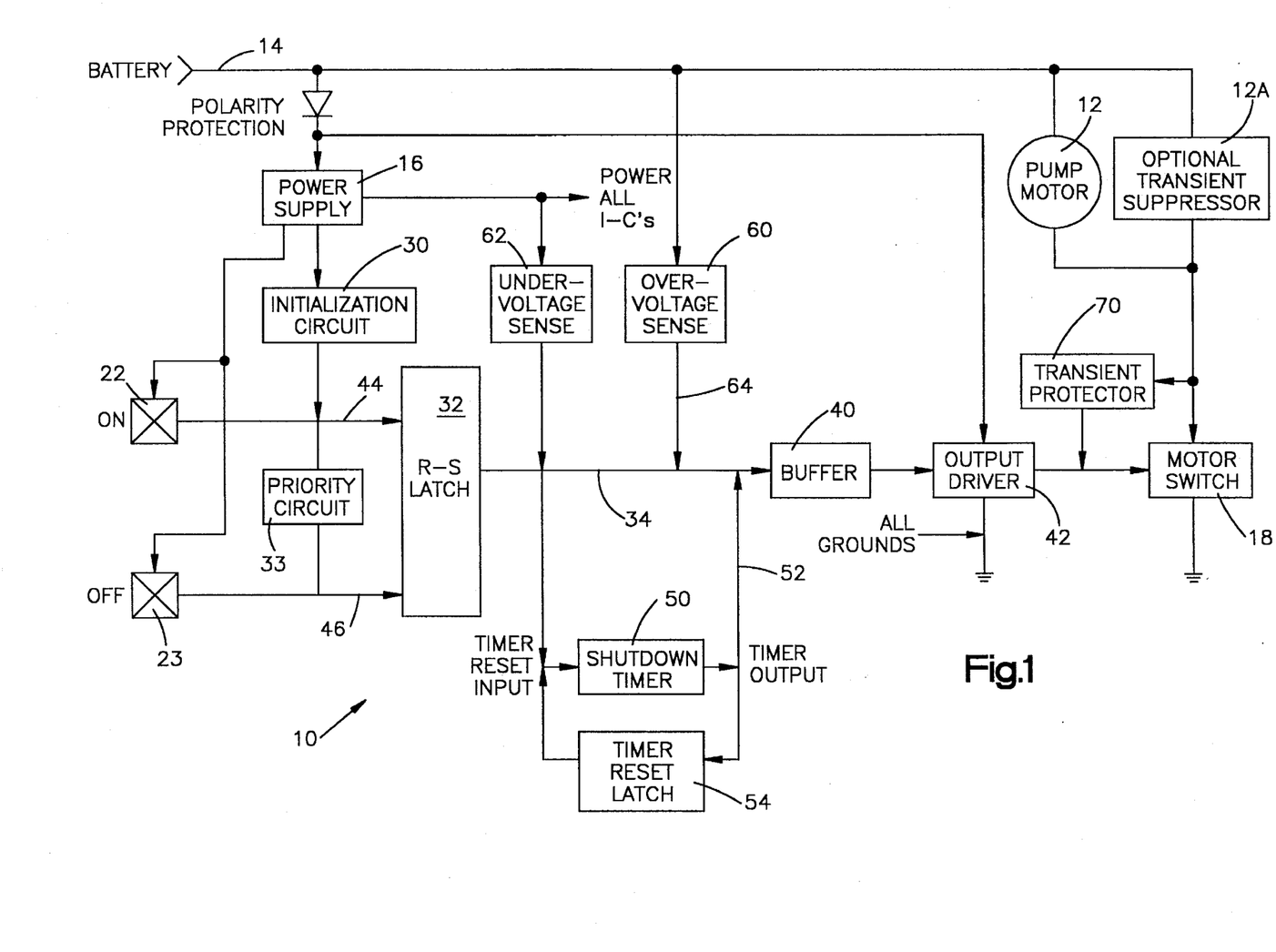
FIG. 1 is a block diagram of an hydraulic pump activation circuit for use with a power steering unit.

Turning now to the drawings, FIG. 1 is a schematic of a power steering control circuit 10 for intermittently actuating a power steering pump motor 12, in response to a sensed pressure condition within a power steering unit. The invention also has applicability to generalized position sensing apparatus employing Hall devices. The particular use of the invention is for a power assisted steering unit used with an outboard motor but the invention has applicability to any automotive, marine, avionic or industrial pneumatic or hydraulic cylinder. The invention also has applicability to position sensing apparatus employing a Hall device.

A boat operator, for example, activates such a system by closing the ignition switch, which through a solenoid (not shown) applies battery voltage to the control circuit 10. A battery input 14 couples a voltage in a range of 12 volts to a power supply 16 which provides a conditioned direct current signal for the remaining components of the circuit 10. The battery voltage is also coupled to the pump motor 12 which, through selective activation of a motor switch 18, energizes the motor and repressurizes hydraulic power steering fluid.

An accumulator 24 is coupled to the hydraulic fluid at one port, which presses against a piston in a cylinder defined by the accumulator. On the opposite side of the piston in the accumulator is a substantially constant quantity of nitrogen gas. The gas forms a buffer for absorbing sudden pressure charges in the hydraulic fluid. The position of the accumulator piston varies as a function of the pressure of the hydraulic fluid.

Two Hall sensors (FIG. 3) 22, 23 are mounted within the cylindrical accumulator 24 (FIG. 4) which supports the piston 25. The sensors 22, 23 monitor movement of the piston 25 in response to hydraulic fluid pressure changes.

Figure 3:
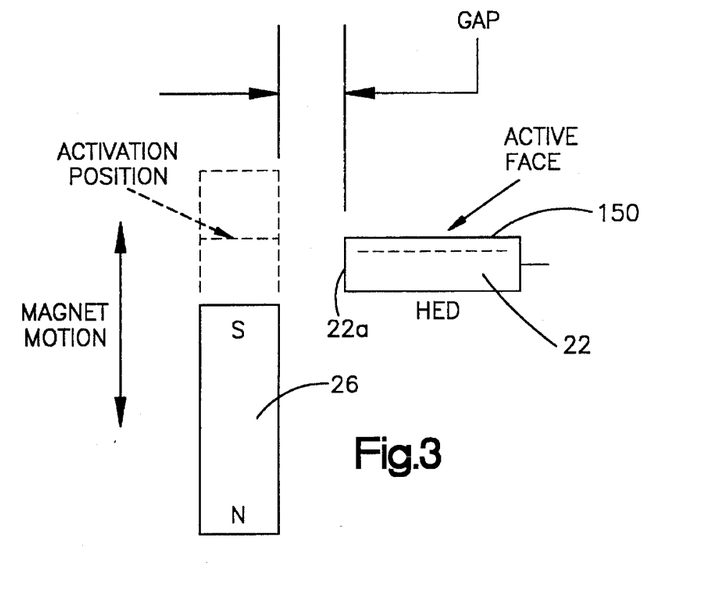
FIG. 3 is a side view showing a Hall sensor mounted within a power steering unit for monitoring movement of a pressure sensitive piston.
Figure 4:
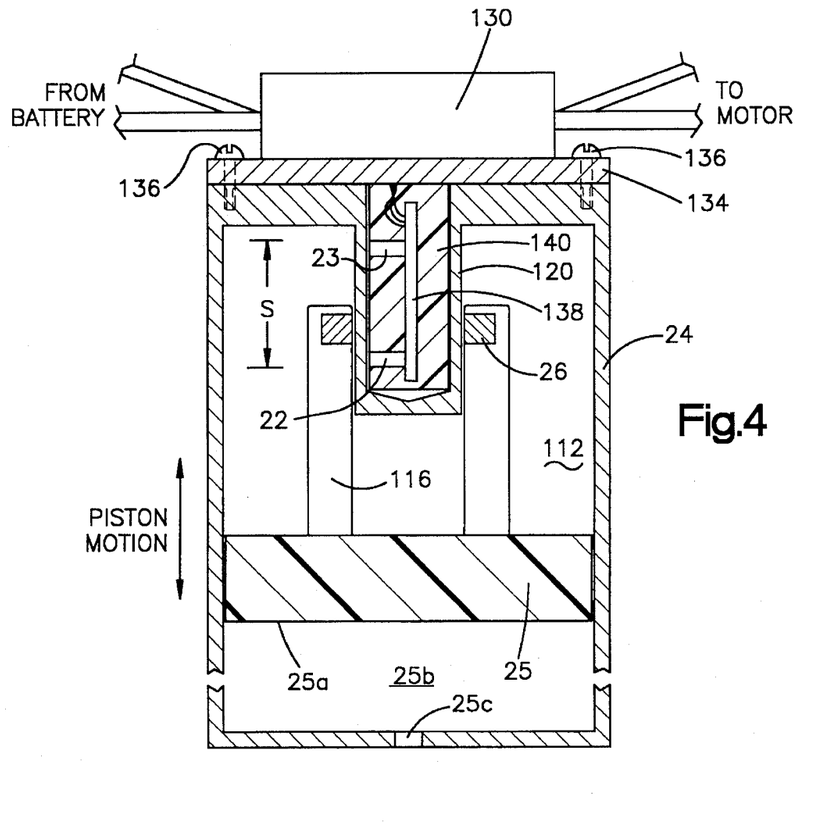
FIG. 4 is a sectional view showing a mounting configuration of two Hall sensors used to monitor pressure variations within the power steering unit.

The two Hall sensors 22, 23 are spaced apart a distance of approximately 0.8 of an inch, and monitor movement of a permanent magnet 26 mounted to the piston as the piston moves back and forth in response to pump pressurization of the hydraulic power steering fluid. When the permanent magnet 26 reaches the Hall sensor 22, it is an indication that the hydraulic fluid pressure needs recharging and an output signal from the Hall sensor 22 is used to activate the pump motor 12. When the magnet 26 reaches the second Hall sensor 23, it is an indication that the hydraulic fluid has been recharged and the pump motor 12 can be de-energized.

The operation and use of Hall effect sensors is described in detail in the following publication, which is hereby expressly incorporated by reference: "Hall Effect Transducers—How to Apply Them as Sensors" Micro Switch Division, Honeywell, 1982. Another publication illustrating uses of Hall effect sensors is "Hall Effect IC Application Guide" Sprague Electric Company, Concord, N.H., U.S.A. This publication is also expressly incorporated by reference.

Upon power up of the circuit 10, the magnet 26 will typically be in a position midway between the Hall sensors 22, 23. The hydraulic fluid is neither fully pressurized nor excessively depleted. In this circumstance, an initialization circuit 30 is designed to activate the pump motor 12 to fully recharge the hydraulic fluid pressure.

Figure 2A:
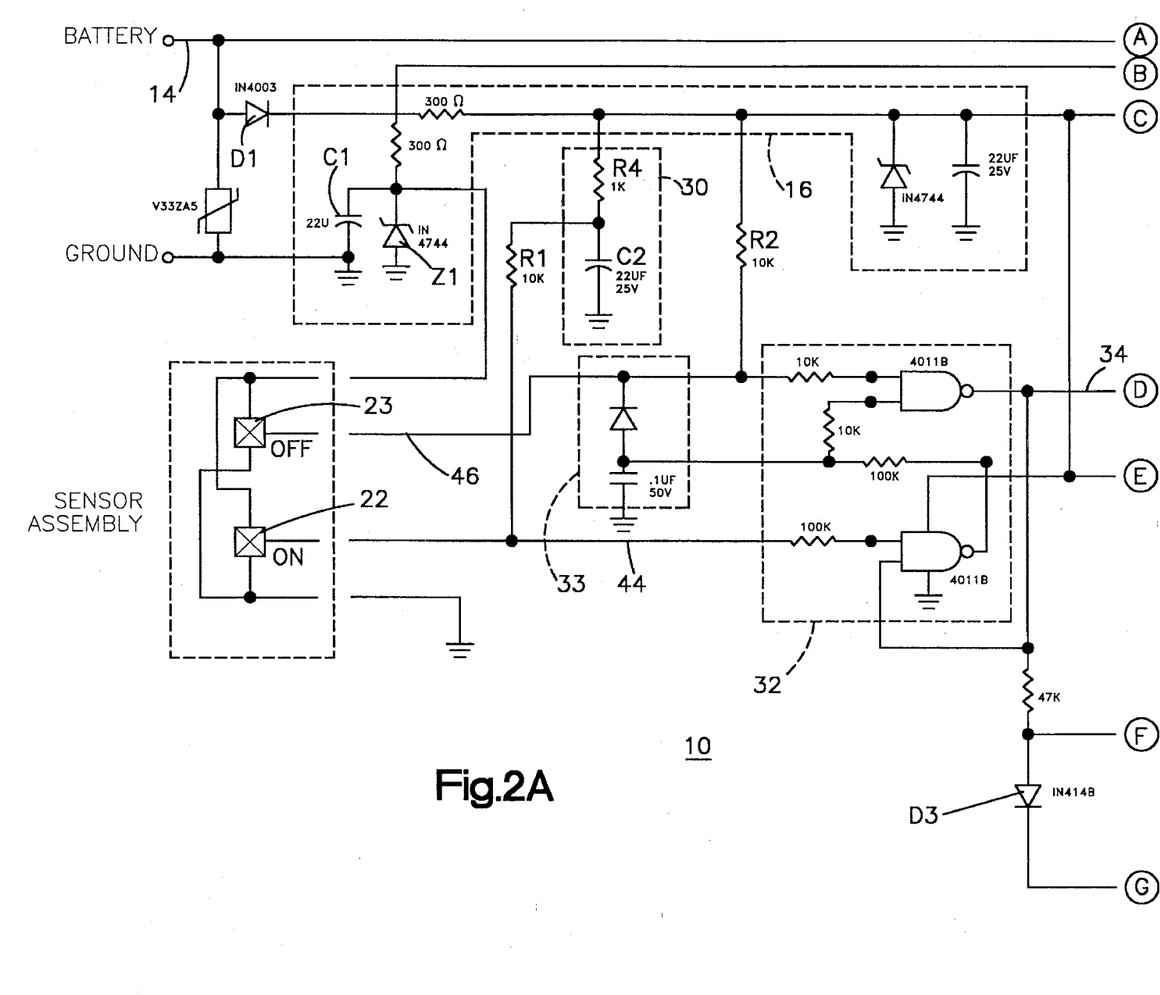
FIGS. 2A and 2B are more detailed schematics showing specific circuit components for the pump activation circuit.
Figure 2B:
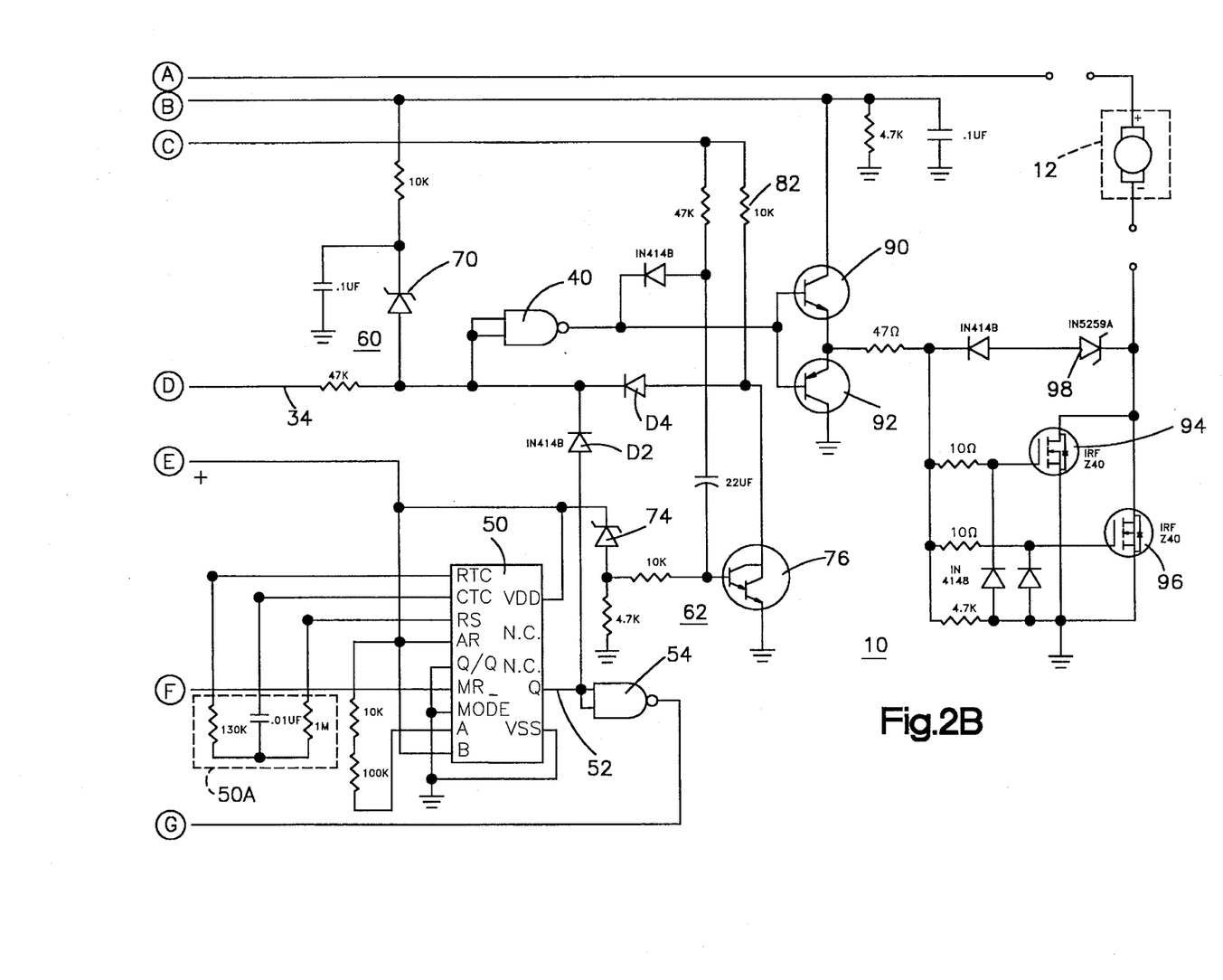

Inputs from the initialization circuit 30 and two Hall sensors 22, 23 are coupled to R-S latching drive circuitry 32 having an output 34 that controllably energizes the motor by activation of the motor switch 18. The output 34 is coupled to a buffer circuit 40 and drive circuit 42 which are depicted in greater detail in FIG. 2. Receipt of an (approximately +12 volts) signal at an input 44 to the latching drive circuitry 32 from the Hall effect sensor 22 causes the driver circuit 42 to activate the switch 18, energizing the motor 12 by applying battery voltage across the motor 12. This repressurizes the hydraulic fluid. The piston 25 moves as hydraulic pressure applied to the accumulator increases and during normal operation, causes the magnet 26 to move in juxtaposition to the Hall sensor 23. The sensor 23 generates an output 46 to the latch circuit 32 indicating the motor switch 18 should be de-activated.

A timing circuit 50 coupled to the output 34 from the latch 32 monitors performance of the system and in the event the magnet 26 never reaches the position of the Hall sensor 23, the timing circuit 50 de-energizes the motor 12. The timing circuit 50 initiates the timing function upon receipt of a signal from the latch 32 indicating the motor 12 has been energized. After a delay period designed to allow the motor to repressurize the hydraulic fluid, (in a preferred design up to 120 second) an output 52 is generated, de-energizing the motor.

The output 52 also activates a latch 54 which inhibits resetting of the timer 50. So long as the timer is not reset, the motor 12 is de-activated. To restart, the operator must toggle the ignition switch off and then back on. This resets the timer 50. In the event motor energization still fails to produce the appropriate fluid pressure as sensed by the Hall device 23, the motor 12 will again be de-activated.

As seen in the block diagram of FIG. 1, the circuit 10 includes an over voltage protection circuit 60, as well as, an under voltage protection circuit 62. In the event of a high battery output voltage 14 caused by jump starting, or by battery or wiring defects, the circuit 60 provides a inhibit signal 64 which de-activates motor energization. In the event of failure of the alternator or excessive battery load, the under voltage sensing circuit 62 shuts down the system until the voltage from the battery is within a proper range. In the preferred range, the circuit 10 is operative so long as the battery voltage is within a range of from 10.5 to 17 volts.

The circuit 10 includes a transient protector circuit 70 which limits spike voltages by clamping the voltage to a safe level. Such voltage spikes are fast acting so that the over voltage protection circuit 60 cannot respond to such spikes in time to open the motor switch 18.

To protect against transient spike energy generated in the motor 12 and exceeding the capabilities of the clamp 70 and motor switch 18, an optional suppressor, indicated by the reference character 12a in FIG. 1, may be added across the motor terminals.

This suppressor, in the preferred embodiment, is a zener diode. Optionally, a reverse polarity blocking diode can be added in series with the zener diode. Other types of suppressors, such as a bi-directional zener diode, or a varistor, may be used as an embodiment of element 12a.

Turning now to FIGS. 2a and 2b, in addition to FIG. 1, the block diagram of FIG. 1 is shown in more detail to show interconnection between circuit elements. The battery input 14 passes through a diode D1 which provides a reverse polarity protection. The motor 12 is not harmed by a reverse polarity input at the battery 14 but other circuit components in the circuitry 10 would be damaged but for the presence of this diode. A zener diode Z1 and capacitor C1 provide a regulated voltage output for the rest of the circuit 10. Two resistors R1, R2 are pull-up resistors for the latching drive circuitry 32. The initialization circuit 30 is formed by the combination of a resistor R4 and capacitor C2. When battery voltage is first applied to the system, the piston 25 is typically intermediate the two extreme positions wherein the Hall sensors are designed to activate and de-activate motor operation. The voltage at the junction between the resistor R4 and capacitor C2, rises from a low value with a time constant dependent upon the component values of this combination. This assures that an input 44 to the latching drive circuitry 32 remains low for a predetermined turn-on. If, however, the output from the sensor 23 at the output 46 is already low, indicating the piston is already positioned at a point indicating the accumulator is fully pressurized, a priority circuit 33 overrides the effect a low signal from the circuit 30 has at the input 44 and assures the motor 12 remains de-energized.

The timer 50 utilizes a No. 4541B integrated circuit having a reset input MR coupled to the output 34 from the latching drive circuitry 32. Upon receipt of a low signal at this reset input, the timer begins to count at a frequency dependent upon an oscillator 50a coupled to the timer 50. When the timer reaches a time-out count, an output 52 goes high and is coupled by a diode D2 to the latch output 34. This shuts off the motor 12. At the same time this high signal is coupled to the output 34, an invertor circuit 54 couples a low input signal back to the reset input to the timer 50 through a diode D3. This signal remains low even if the output 34 from the latch 32 goes high indicating the motor operation should be terminated. To reset the timer 50 once it times out requires the toggling off and on of the ignition.

The over-voltage protection circuit 60 is formed by a resistor and series coupled zener diode 70 connected to the output 34 from the latching drive circuitry 32. In the event the battery voltage rises to a sufficiently high value to cause the zener diode 70 to conduct, the output 34 from the latching drive circuitry 32 is pulled high and the motor 12 is deactivated. The low-voltage sensing circuit 62 is formed from the combination of a zener diode 74 and transistor 76.

So long as the zener diode 74 conducts, the output from the transistor 76 is low and a diode D4 coupled to the output 34 remains reverse biased. If the transistor 76 turns off, a resistor 82 pulls the voltage on the diode D4 up to a level which causes the diode to conduct and pull the output 34 high, turning off the motor.

The combination of two transistors 90, 92 coupled to the output from the buffer amplifier 40 constitute the driver circuit 42. These transistors 90, 92 form a "totem-pole" driver for activating the two FET switching transistors 94, 96 of the motor switch 18. The driver 42 supplies a low-impedance source/sink switching signal to charge/discharge the gate capacity of the FET switching transistors 94, 96. Fast switching minimizes high power pulses occurring during the switching times.

Transient voltage protection for the circuit 10 is afforded by the FET internal diode for negative transient protection and by a zener diode 98 which turns on the FET for the period of the transient during positive spikes. The zener breakdown voltage is selected to be higher than the rated battery output voltage but lower than the FET breakdown voltage.

Turning now to FIG. 4, the arrangement of the sensing electronics with respect to the accumulator 24 is depicted. The accumulator 24 defines a cylindrical chamber 112. The chamber 112 contains pressurized nitrogen gas. It is desirable that the mass, or number of nitrogen molecules, within the chamber 112 be substantially constant. While inadvertent leakage of pressurized nitrogen from the chamber 112 does not generally occur rapidly, known means can be provided for replenishing the amount of nitrogen in the chamber 112 from time to time. Such means can comprise nothing more complicated than a pressurized tank of nitrogen which can be coupled to a gas port on the accumulator which communicates between the exterior of the accumulator and the chamber 112. Such equipment is not specifically shown herein, since the design of such apparatus is well within the ordinary skill in the art.

The accumulator 24 comprises a cylindrical piston 25 which, in FIG. 4, defines the lower boundary of the chamber 112. The piston 25 is adapted for pressure-responsive movement up and down, as shown in FIG. 4, within the interior of the accumulator.

The accumulator cylinder also defines a lower chamber 25B below the lower surface 25A of the piston 25. The chamber 25B is filled with hydraulic fluid, and communicates with the hydraulic fluid of the hydraulic power steering system by way of an oil port 25C. Thus, the pressure exerted on the lower surface 25A of the piston 25 is equal to the hydraulic fluid pressure of the hydraulic system itself.

As mentioned above, the piston 25 is adapted for movement up and down within the accumulator 24 as a function of the pressure exerted on the piston. If the amount of nitrogen gas in the chamber 112 is constant, the position of the piston will be a function of the pressure of the hydraulic fluid in the system. If the fluid pressure in the hydraulic system is constant, the piston 25 will seek an equilibrium position at which the pressure of the gas in the chamber 112 is equal to the hydraulic pressure applied via the chamber 25B. If, subsequently, the hydraulic pressure of the fluid in the system rises, the piston will move upwardly. Conversely, if the hydraulic fluid pressure is reduced, the piston will move downwardly until a new equilibrium position is reached.

As the power steering, or associated other type of hydraulic system, is used, the pressure experienced at the lower surface 25A of the piston 25 will decrease. This, as explained above, will cause the piston 25 to travel downwardly in the accumulator until a new position of equilibrium is reached. If the hydraulic pump is actuated, raising the pressure of the hydraulic fluid, the piston 25 will experience a greater upward force, and will travel upward, compressing the gas in the chamber 112 until the gas pressure reaches a point at which equilibrium is again reached.

It is this pressure-responsive movement that the circuitry and apparatus of the present invention is designed to monitor. When the piston moves downwardly a sufficient amount to actuate the Hall sensor 22, that actuation turns on the hydraulic pump. The hydraulic pressure in the fluid begins to rise, and the piston moves upwardly. When the piston has moved upwardly a sufficient distance to actuate the other Hall sensor 23, the pump is turned off. The pump remains off, under normal operating conditions, until the pressure of the hydraulic fluid again drops to a level low enough to cause the pump to be actuated again.

Movement of the piston 25 within the accumulator cylinder causes corresponding movement of a cylindrical piston extension 116, which carries the magnet 26, to move in relation to the two Hall sensors 22, 23 coupled to the accumulator 24.

One end of the accumulator 24 defines a cylindrical well 120 which extends into the cavity or chamber 112 a sufficient distance to allow the two Hall sensor 22, 23 to be inserted into the accumulator for monitoring movement of the magnet 26. The accumulator and particularly the portion of the accumulator which defines the well 120 is constructed from aluminum which does not disrupt the magnetic field created by the ring magnet 26.

An electronics module 130 that encloses the circuit 10 is fixed to one side of a rigid support 134 affixed to the accumulator by threaded connectors 136. The sensors 22, 23 are connected to an opposite side of the rigid support 134. During fabrication of this unit, the Hall sensors 22, 23 are mounted to a printed circuit board 138 at a spacing S. In the preferred embodiment of the invention, the spacing S is approximately 0.8 inches. A solid PVC (polyvinylchloride) tube 140 is molded around the sensors 22, 23 after signal carrying conductors, in the form of a ribbon cable routed from the circuit 10, are coupled to the sensors 22, 23. As the magnet 26 moves back and forth within the accumulator cavity 112, appropriate signals are generated via the Hall sensors 22, 23 and transmitted to the electronics module 130 for activating and de-activating the motor. As seen in FIG. 4, a ground connection and battery input are coupled to one side of the electronics module 130 and two motor energization leads are coupled to an output portion of the module 130.

A new technique is utilized for monitoring the position of the ring magnet 26 with respect to the two Hall sensors 22, 23. As seen in FIG. 3, the Hall sensors are mounted so that an active face 150 of the Hall sensor 22, for example, is perpendicular to the movement of the ring magnet 26. In the FIG. 3 depiction, a south pole of the ring magnet 26 is presented to a back side, away from the active face 150 of the Hall effect device 22. As the magnet moves past the plane of the Hall effect element within the sensor, the south pole lines of force penetrate the active face and produce a Hall effect output signal. The gap between the Hall effect device and magnet is maintained uniform as the magnet moves back and forth past the Hall sensors 22, 23. This gap spacing is not critical and gaps in the range of about ¼ inch between the Hall effect device and the ring magnet, have been used with success. In a preferred design, this gap spacing is approximately 0.150 inch. To minimize this gap spacing, the polyvinylchloride tube 140 can be molded around the sensor support and sensors so that an edge 22a (for example) of the Hall effect sensor, extends beyond the boundary of the tube 140 and butts against an inner wall of the accumulator well 120.

Figure 7:
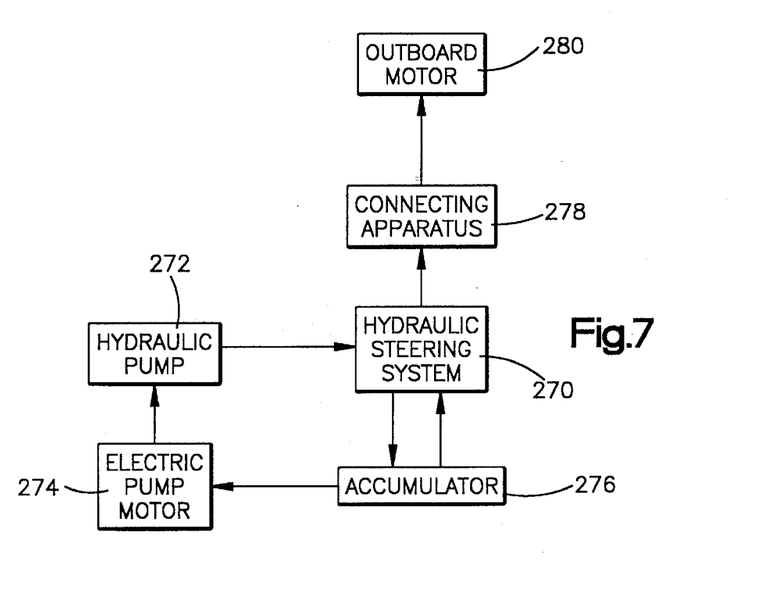
FIG. 7 is a block diagram of a hydraulic power steering system incorporating an embodiment of the present invention.

FIG. 7 shows in block form the manner in which the hydraulic steering system, outboard motor, pump, accumulator and pump drive motor are coupled together in an integral system.

The hydraulic steering system is designated in FIG. 7 at reference character 270. This system is similar to the outboard hydraulic steering system described in the Background section preceding in this document. The hydraulic steering system 270 drives a known type of connecting apparatus 278, which in turn applies steering force to the outboard motor 280 where that force is appropriate. The structure of the connecting apparatus 278 is well known, and the construction of such an apparatus is easily accomplished by one of ordinary skill in the art. The accumulator 276 is similar in structure and function as the accumulator described in connection with FIG. 4 above. The accumulator, as indicated by the double arrows between the block designating the accumulator and the block designating the hydraulic steering system, is in direct communication with the hydraulic fluid of the hydraulic steering system, and responds to changes in pressure of the hydraulic fluid.

The accumulator, in response to changes in hydraulic system fluid pressure, governs the actuation of the pump motor 274, which in turn controls the operation of the pump 272. When the pump 272 is operated, it elevates the pressure of the hydraulic fluid in the hydraulic steering system 270. The accumulator senses changes in hydraulic fluid pressure by means of the magnet 26 and Hall sensors 22, 23, in the manner described in connection with FIG. 4 above.

The design of an accumulator is believed well within the ordinary skill in the art. For those not intimately familiar with the art, however, reference is made to U.S. Pat. No. 4,364,416, which is hereby expressly incorporated by reference, and which describes in considerable detail the applications of accumulators, and describes the structure of a known form of accumulator.

Figure 12:
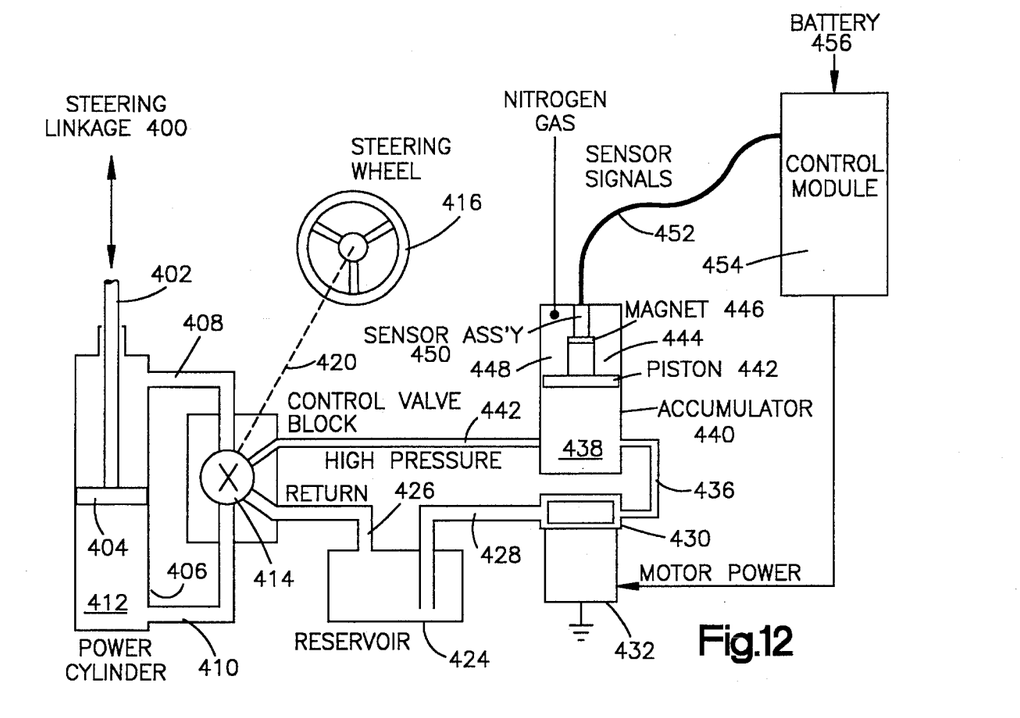
FIG. 12 is a schematic illustration of a power steering system incorporating the present invention.

FIG. 12 illustrates in schematic form a power steering system incorporating the present invention.

A steering linkage 400 is referred to in the upper left corner of FIG. 12. The steering linkage can be any type of suitable mechanical linkage for transmitting steering assist force from a piston rod 402 to the element of a vehicle, boat, or the like to which steering assist force is desired to be applied. The steering linkage can be mechanical, hydraulic, pneumatic or any suitable such means. Its design is well within the ordinary skill in the art. The piston rod 402 is connected to a hydraulic piston 404 located within a hydraulic cylinder 406.

Two hydraulic lines 408, 410 lead to opposite ends of the cylinder 406. When hydraulic fluid under pressure is forced into the lower chamber 412 of the cylinder, below the piston 404, the piston is forced upwardly, as well as the piston rod 402. When hydraulic fluid under pressure is applied by way of line 408 to the chamber of the hydraulic cylinder above the piston 404, the piston 404 is downwardly forced, and so is the piston rod 402.

A valve 414, in response to mechanical stimulus, determines whether hydraulic fluid is directed to the cylinder 406 by way of hydraulic line 408 or 410. Hydraulic fluid is not simultaneously directed to both lines 408 and 410.

The mechanical stimulus is applied to the valve 414 by means of a steering wheel 416. The steering wheel is controlled by an operator to guide the course of the vehicle or boat to which the power steering system is applied. Mechanical stimulus is applied from the steering wheel to the valve by means which is capable of design by one of ordinary skill in the art, and which is indicated generally by a dashed line designated 420.

High pressure hydraulic fluid is directed to the valve 414 by way of a high pressure line 422. It is this high pressure hydraulic fluid which is applied by the valve to one or the other sides of the piston 404 in response to action of the steering wheel 416.

When the piston 409 is moved in one direction or another by application of high pressure hydraulic fluid to one side of the piston 404, the resulting piston movement requires that hydraulic fluid be returned from the chamber on the side of the piston defined by the direction in which the piston is moving. This return hydraulic fluid is directed to a reservoir 424 by way of a return line 426.

Hydraulic fluid is drawn from the reservoir by way of a line 428, by the action of a hydraulic pump 430. The hydraulic pump 430 is driven by an electric motor 432 when the motor is actuated.

Hydraulic fluid is carried from the pump, by way of a line 436 through an oil port into a lower chamber 438 of an accumulator 440. The chamber 438 is located below a piston 442 in the accumulator.

A piston extension member 444 is mounted to the piston 442, and carries a magnet 446 at its upper end. The polarity of the magnet 446 is substantially parallel to the axis of the cylinder comprising the accumulator 440.

The accumulator defines a chamber 448 above the piston. The chamber 448 contains nitrogen gas. Alternately, the accumulator could contain another gas a spring or even a dead weight.

A sensor assembly, generally designated 450, cooperates with the magnet 446 to produce sensor generated control signals which are transmitted over an electrical cable 452 to a control module 454. The structure and interrelationship of the magnet and of the sensor assembly is not illustrated in detail in FIG. 12, but is constructed in accordance with the description given above in connection with FIG. 4.

The control module is powered by electrical power from a vehicle battery which is generally designated at 456. The control module controls the application of battery power to the pump motor 432 by way of an electrical lead 458.

In operation, when the sensor assembly produces a signal which indicates that the accumulator piston has fallen far enough to indicate a need for recharging hydraulic pressure, the control module passes battery power to the pump to actuate the pump. Such actuation increases the hydraulic pressure, and causes the piston in the accumulator to rise. When the piston has arisen sufficiently far enough to indicate that the hydraulic pressure has been fully restored, to a predetermined desirable value, the control module, in response to the sensor assembly control signal, interrupts the application of battery power to the pump motor, and the pump again turns off until hydraulic pressure has dropped sufficiently to warrant repressurization.

Figures 5, 6:
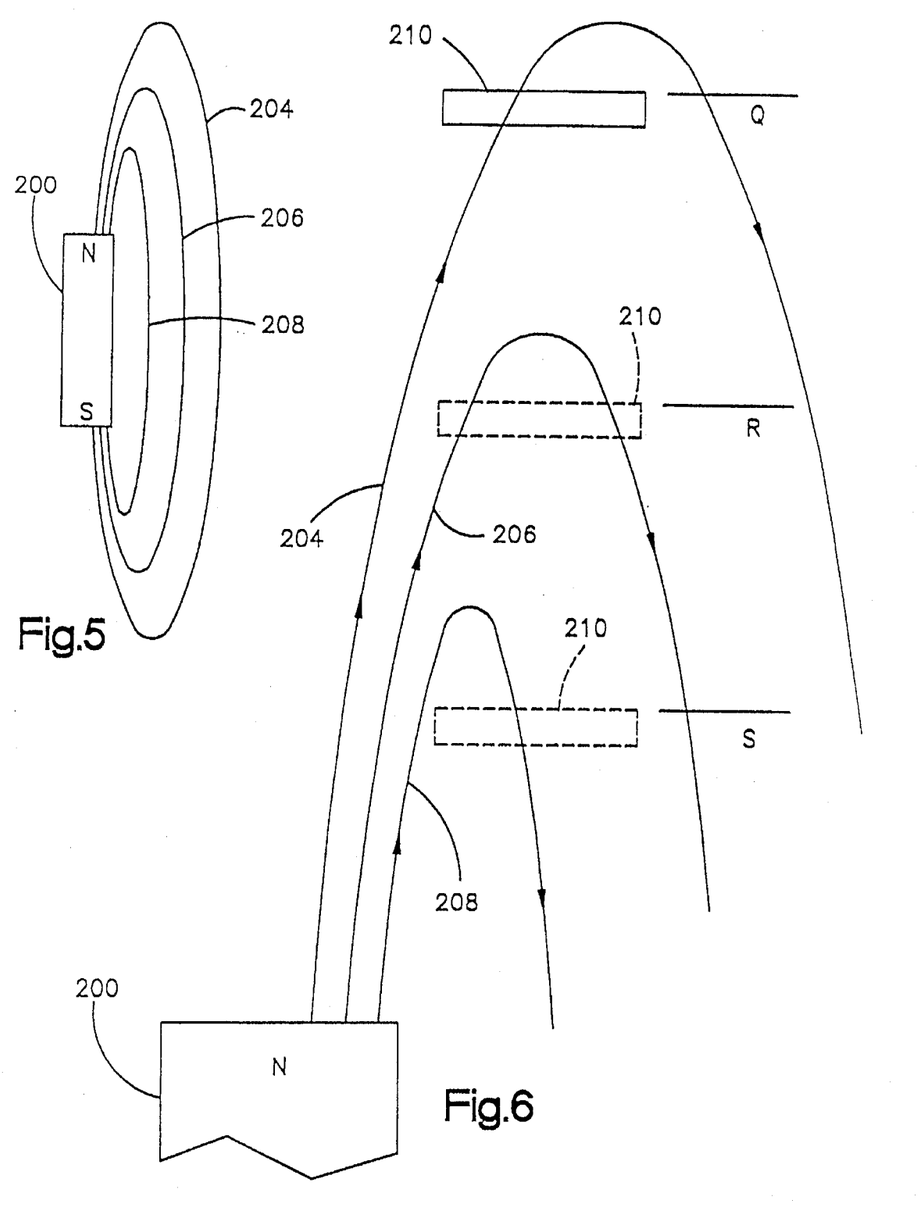
FIG. 5 is a schematic diagram of a magnet for use in connection with a Hall sensor of the present invention.
FIG. 6 is a detail view illustrating the physics of interaction between the magnet of FIG. 5 and a portion of a hall sensor in accordance with the present invention.

FIGS. 5 and 6 illustrate in more detail the physical phenomenon whereby the Hall effect device embodying the new technique operates. FIG. 5 shows a bar magnet 200 having north and south poles designated by the reference characters N and S, respectively. FIG. 5 also illustrates three exemplary lines of flux 204, 206, 208 produced by the magnet 200. The flux is deemed to flow in a direction from the north to the south poles along the flux lines.

FIG. 6 illustrates in greater detail how the magnet 200 interacts with a Hall element mounted for movement according to the geometry of the new technique. FIG. 6 illustrates in broken away form the north pole of the magnet 200, and the exemplary flux lines 204, 206, 208. FIG. 6 also illustrates a Hall element 210 mounted for movement with respect to the magnet 200. More specifically, the Hall element 210 is mounted for relative movement in the direction indicated by an arrow 211 in FIG. 6.

The Hall element 210 is shown in solid lines in a position such that its upper surface, which defines the active face of the element, coincides with the level indicated as Q. The Hall element 210 is shown in phantom at two other lower positions, with respect to FIG. 6. The element 210 is shown in phantom at a level wherein its upper active surface coincides with a location R. The Hall element is also shown at a still lower position at which its upper face coincides with a level indicated as S. The Hall effect device of the present invention operates differently than the so-called "head-on" and "slide-by" devices described int he foregoing background art section. The head-on and slide-by devices operate to produce a substantially analog signal of constant polarity which varies in magnitude. The analog variation in magnitude indicates the relative position of the magnet and Hall element.

In the present device, on the other hand, the fact of the magnet and Hall element reaching a predetermined relative position is indicated by a change in polarity of the output form the Hall element, rather than simply a change in magnitude of a signal having a constant polarity, as in the prior art.

The signal output from the Hall element changes in polarity when the net electromagnetic flux passing through the active face of the Hall element changes from an upward to a downward direction. Reference to FIG. 6 will explain this phenomenon.

At a first time, the Hall element has moved relative to the magnet to a location wherein its active face coincides with the level Q. At this location, the only flux line passing through the active face is the line 208, which passes through the active face in an upward direction.

At a second time, the Hall element has descended, relative to the magnet, to the level indicated as R. AT this level, it can be seen that the flux, as exemplified by the flux line 206, passes both upwardly through the face and downwardly through the face, such that the net magnetic flux passing through the active face is substantially zero.

As motion continues, the Hall element reaches the level indicated as S. At this location the flux passing through the active face of the element, as exemplified by the flux line 208, has a net downward value.

In operation, when the Hall element is above the level R, the net flux through the active face is in an upward direction, and the polarity of the output of the Hall element remains constant. When the Hall element is positioned with its active face below the level R, the net flux through the active face in a downward direction, and polarity is again constant, but appositive in direction to the polarity of the output occurring when the Hall element is above the level R. It is at the location R that the polarity of the output of the Hall element changes from one direction to the other. This indicates with great accuracy that the active face of the Hall element is at the position R relative to the magnet.

This change occurs with a very high gradient, and is seen as an abrupt switching of the polarity of the signal output from the Hall element. Tests have shown that this switching of output polarity can occur in response to relative movement between the magnet and the Hall element in the neighborhood of 0.01 inches. This in contrast to displacements of 1/16 to 1/4 inch, which are necessary to produce a reliable, repeatable, signal indicating movement in the prior art "slide-by" and "head-on" Hall effect devices.

In many types of systems involving the use of fluids under pressure, there is a need to monitor the position, or positions of a piston or other moveable component of the system. Often, such a component is located inside a vessel which contains the fluid under pressure. For the purposes of this discussion, the term "fluid" should be taken as meaning either a liquid or a gas.

Systems utilizing fluids under pressure include, but are not limited to, hydraulic brake systems, pneumatic brake systems and hydraulic lift systems of various kinds. Such systems are widely used in automotive, marine, avionic and industrial applications.

Figure 9:
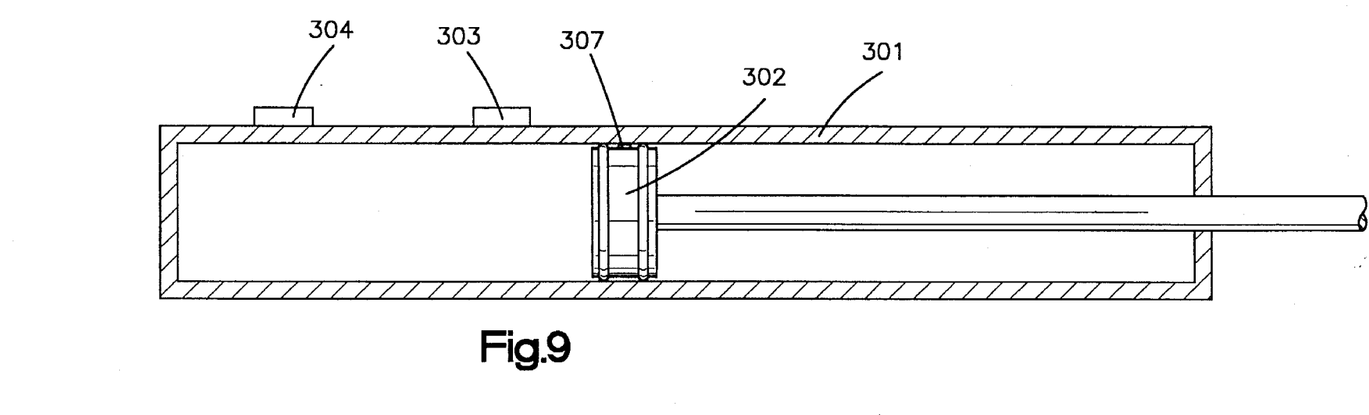
FIG. 9 is an elevational view, partially in cross-section, illustrating a portion of a brake system incorporating the present invention.

A typical problem in such systems involves the monitoring, or sensing, of the position of a piston within a hydraulic cylinder. A portion of a hydraulic cylinder assembly is illustrated in FIG. 9. FIG. 9 shows a hydraulic cylinder 301 with an enclosed piston 302 slidably located therein. In the embodiment of FIG. 9, the cylinder 301 contains hydraulic fluid. The hydraulic fluid comes under high pressure when the brake system is operated.

Figure 8:
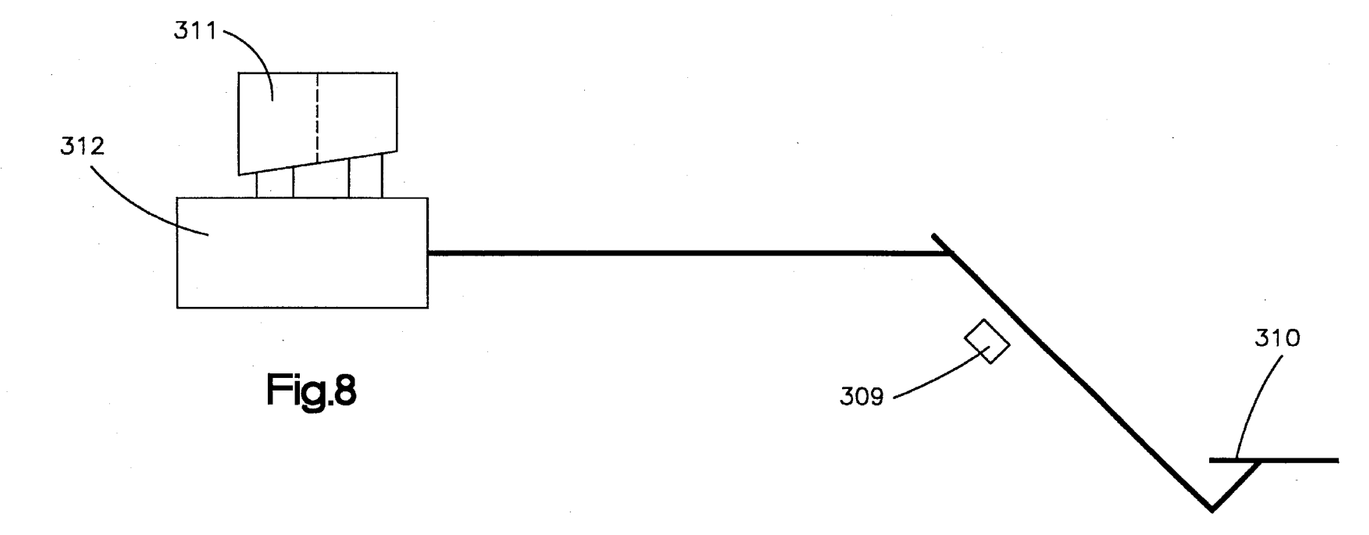
FIG. 8 is a schematic mechanical drawing of a brake system of the prior art.

In existing brake systems, brake actuation is detected by way of a contact switch, such as shown as 309 in FIG. 8. The switch is placed at or near a brake pedal such as 310, and mechanically connected thereto. Additionally, fluid levels in a master cylinder reservoir, such as shown at 311, remained unmonitored in most systems.

It is desirable, for safety and other reasons, to be able to monitor very closely the master cylinder piston position in a hydraulic brake system.

In automotive braking systems, among other pressurized fluid applications, resolution on the order of ±0.01 inches are required for sensing the position of moving components within the pressurized fluid system. In such a case, existing Hall sensor implementations are inadequate unless costly calibration and compensation electronics are used in conjunction with such sensors.

However, the Hall effect sensor configuration described above in this application, particularly in connection with FIGS. 3–6, enable position sensing resolution of ±0.01 inches for single switch points. A switch point is the point at which a moveable magnet, attached to a system component, causes the output of the Hall element sensor of this invention to change polarity.

As mentioned above, the novel Hall element sensor described herein can define such a switch point to within a resolution of ±0.01 inches.

Furthermore, this extreme resolution is accomplished without costly and complicated calibration or compensation electronics.

Referring again to FIG. 9, two such novel Hall effect sensors, 303, 304, and the switch points 305, 306 which they respectively define are shown. Preferably, these Hall effect sensors are not of the prior art "slide by" or "head on" variety. Rather, these Hall element sensors, and their actuating magnet, described below, are constructed and oriented in a manner analogous to that described above in connection with FIGS. 3–6. The switch points 305, 306 are each indicated by dashed lines through the wall of the master cylinder 301. The cylinder 301, however, itself has no discontinuities, such as recesses, or holes, slots or other apertures at the locations of the respective sensors 303, 304. The cylinder wall is intact.

With this configuration, a magnet 307 is positioned in the side of the piston 302 such that, as the piston moves left and right, as shown in FIG. 9, the magnet 307 traverses a path which sweeps it past the sensors 303, 304. As mentioned above, the sensors 303, 304, and their configuration and geometry relative to the magnet 307, are analogous to the configuration and geometry of the relationships between the magnet as shown in FIG. 4 and the sensors 22, 23, shown and described in connection with that figure.

Alternately, the magnet 307 can comprise all or a portion of a ring magnet which extends about part or all of the circumference of the piston 302. The ring magnet is depicted by the reference character 308 in FIG. 9B.

Whatever the form of the magnet 307, when it passes the switch point of a particular one of the sensors 303, 304, due to movement of the piston, it will switch the polarity of output of the associated one of the sensors 303, 304, providing an indication that the piston has moved to a particular position, relative to the switch point whose position is defined to a resolution of ±0.01 inches. As illustrated in FIG. 9, the sensor 303 would activate (change output polarity) near the start of the piston's stroke in response to the depression of a brake pedal. This would provide a "brake system activated" signal. The sensor 304, located near the end of the piston's travel stroke, would activate and thereby produce an "end of stroke" or "over stroke" condition signal.

Such signals can be applied in various ways. For example, in a braking system associated with a vehicle having brake lights, the activation of the sensor 303 can be coupled to activate brake lights in a manner easily accomplished by those of ordinary skill in the art. Likewise, if the brake system is employed in association with a vehicle having so-called "cruise control" or "speed control", the signal produced by the activation of the sensor 303 can be coupled to known electrical equipment for disabling the cruise or speed control, in response to even a slight depression of the brake pedal.

Actuation of the sensor 304, which occurs in response to overtravel of the piston, can be employed to actuate an indication of low brake fluid level condition or sensing stream braking effort. In some brake systems sensor 304 would be omitted.

It must be appreciated, however, that in the most general application, one or more sensors can be used to define switch points to monitor the motion of many types of components of brake and other systems. For example, sensor actuation can be used to monitor the motion of a piston, a spindle, a valve stem or other moving part within a pressurized fluid system of any kind.

The cylinder of FIG. 9 is drawn in simplified form for clarity, and does not explicitly show ports communicating with the reservoir and the brake lines. It should be understood that the cylinder of FIG. 9 contains ports and couplings analogous to those shown in connection with FIG. 10, described below.

The sensors 303, 304 can optionally be located in recesses defined in the external wall of the cylinder, but without actually extending through the cylinder wall into the cylinder interior. Such a configuration can increase the resolving power of the sensor and enhance the sensor's signal to noise ratio.

Figures 10, 11:
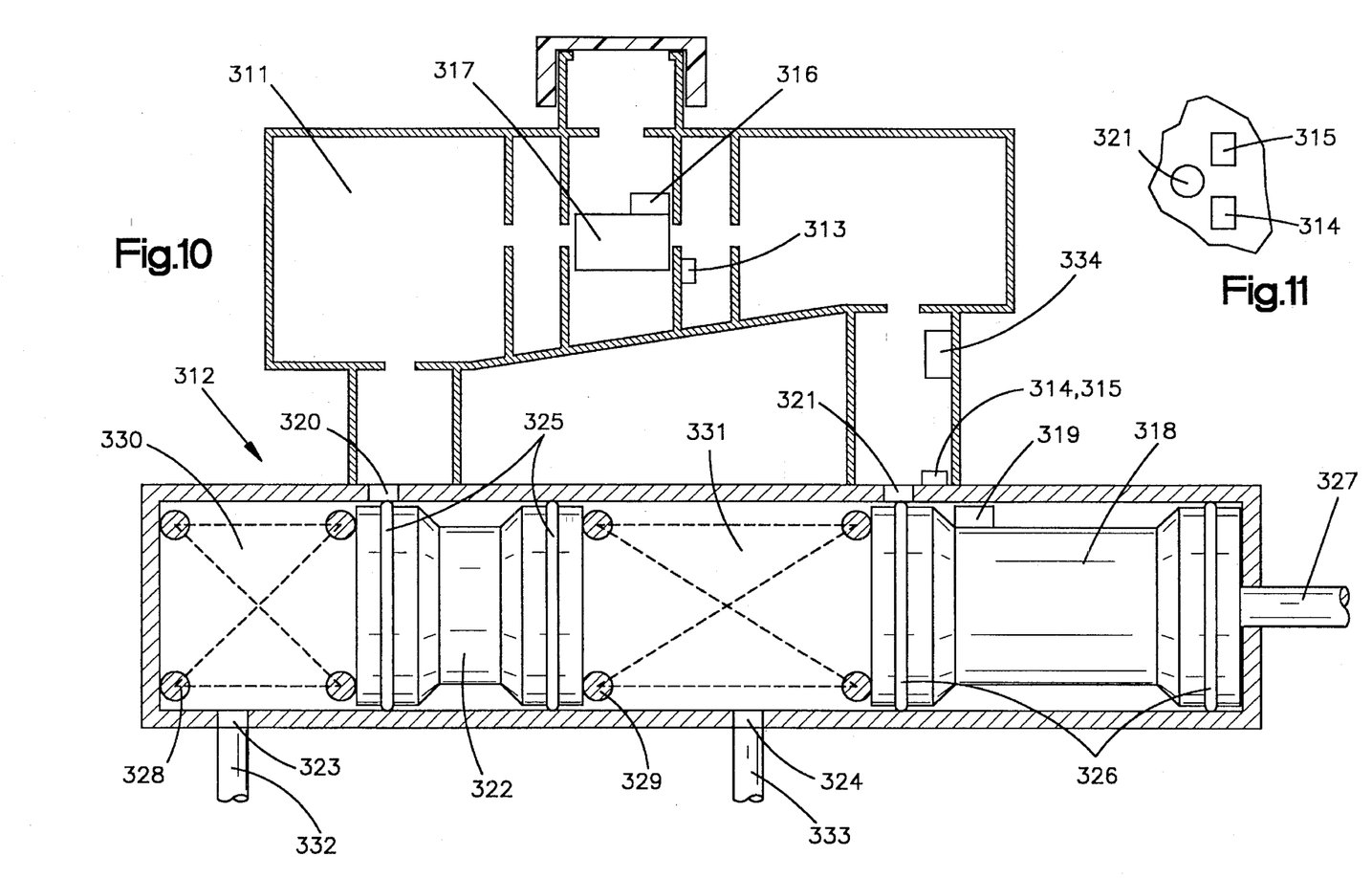
FIGS. 10 and 11 are detailed schematic illustrations of a braking system incorporating the present invention, the braking system including a master cylinder, reservoir, several sensors and the associated brake lines and other peripheral components.

FIG. 10 illustrates in more detailed form a braking system incorporating piston position monitoring apparatus and circuitry according to this invention. The monitoring apparatus and circuitry is incorporated into a master cylinder 312, in association with a master cylinder reservoir 311.

Referring to FIG. 10, the location of sensors 313, 314, 315 are shown. The sensors 313, 314, 315 are of the Hall effect type described above.

The sensor 313 defines a switch point at which the sensor is activated (changes polarity) when a magnet 318 mounted on a reservoir float 317 falls below the switch point. This actuation provides a "low fluid" indication.

The sensor 314, along with the sensor 315, define switch points to actuate brake lights and/or de-activate cruise or speed control when the brake cylinder piston 318 has traveled 0.040 inches in response to brake pedal depression. This signal is provided by cooperation between the sensors 314, 315 and a magnet 319. The indication is provided when the magnet 319 is swept by the switch points 1.0 defined by the sensors 314, 315. Optionally, 315 could be omitted and 314 used to operate both brake light and speed control.

The wall of the master cylinder defines ports 321, 320 both of which communicate with the brake fluid reservoir.

Note that the master cylinder, in the embodiment of FIG. 10, is provided with two pistons, 318, 322. These pistons move in unison in response to brake-pedal action. When the piston 322 moves to the left a sufficient amount, as shown in FIG. 10, it will block the port 320. When the piston 318 moves to the left, as shown in FIG. 10, it will block the port 321.

The indication of brake-piston travel over the first 0.040 inches of its excursion provides the brake light/cruise control disable signal prior to the time at which the pistons 318, 322 block their respective ports 321, 320.

Once the ports 321, 320 become blocked, the brake fluid pressure is delivered entirely to a set of ports 323, 324, coupled to the brake line, which result in brake actuation.

A sealing interface is maintained between the pistons 318, 322 and the cylinder wall by ring seals 325 and 326.

Piston movement is initiated by force from a piston rod 327 which is mechanically coupled to the brake pedal which is actuated by the operator.

A pair of springs 326 and 327 provide resilient force for recovery of the brake pistons to the inactive, or neutral, position of the pistons 318, 322 when force is removed from the piston rod 327. The stiffness of the springs 328, 329 allows a proportionate hydraulic fluid pressure delivery to ports 323, 324. Upon recovery to equilibrium position, cavities 330, 331, in which the springs 328, 329 are located, are recharged with hydraulic brake fluid drawn back through the ports 323, 324 by way of brake reservoir lines 332, 333 and/or through ports 320, 321, from the master cylinder reservoir.

A significant feature of the brake system shown in FIG. 10 is that a leak in either side of the reservoir 311 or in either of the cylinder cavities 330, 331 will result in only a partial failure of the brake system. In either case, at least one of the two ports 323, 324 which are connected to brake lines 332, 333 will still deliver pressure when the piston rod 327 applies force to the pistons.

Although details of the master cylinder design may vary, essential elements of the master cylinder and associated components are represented in FIGS. 10 and 11. The details of the master cylinder, and of its associated piston position monitoring elements, are applicable to all forms of automotive, marine, avionic or industrial applications.

Note that FIG. 11 shows a "side by side" orientation for sensors 314 and 315, which positions sensors for simultaneous actuation by the same moving magnet, at slightly different switch points. In the simplest application, 315 would be omitted and 314 would trigger both the brake lights and deactivation of cruise control.

Note that, in the embodiments described herein, the magnet is oriented so that its magnetic axis is normal to the active face of its associated Hall elements. In this case, the magnet axis is also parallel to the brake cylinder axis. Therefore, the Hall element active face is normal to the cylinder axis.

Preferably, an electronics package 334 is located in the reservoir 311, as shown. The electronics need not, however, be at that particular location in the reservoir. Additionally, the electronics package may be divided into two distinct packages at two locations in the reservoir to drive the sensor 313 separately from the sensors 314 and 315, in order to simplify known harnessing and initialization requirements.

The electronics package includes means for providing electrical power to the various sensors in a manner analogous to that described in connection with FIGS. 1–3. Electronic and electrical means for sensing actuation of the various sensors is also analogous to that shown in connection with FIGS. 1–3.

Once the actuation of the respective sensors is detected, the provision of electrical means for providing an indication of brake actuation, of actuating brake lights, or of deactuation of cruise control, is believed well within the ordinary skill in the art. The artisium of ordinary skill can choose from among conventional switching, relay lamp and other indicator circuitry.

We claim:

1. Apparatus for driving a piston with fluid power, said apparatus comprising:
   a) a fluid filled cylinder having an inner and an outer wall and defining a longitudinal axis;
   b) a piston slidably positioned in said cylinder to move along a path of travel parallel to the longitudinal axis;
   c) a magnet coupled to the piston for movement with said piston;
   d) a pump in fluid communication with said cylinder and being selectively actuated to intermittently pump pressurized fluid into the cylinder to apply force to and move said piston in a first direction along the path of travel;
   e) fluid releasing apparatus in fluid communication with said cylinder for releasing fluid from the cylinder to move the piston along the path of travel in a direction opposite to said first direction;
   f) a Hall effect sensor situated at a location along the outer wall of said cylinder for sensing a position of said piston along the path of travel in the cylinder by sensing a magnetic field associated with the magnet at the location of the sensor; and
   g) control circuitry coupled to an output from the Hall effect sensor for actuating the pump to pump pressurized fluid into the cylinder at periodic intervals in response to movement of said piston in said cylinder.

2. The apparatus of claim 1 wherein said Hall sensor has an active face and further the magnet defines a magnetization axis fixed with respect to said piston and aligned with the path of travel of said piston in the cylinder.

3. The apparatus of claim 2 wherein the active face of the Hall sensor is oriented orthogonally to the longitudinal axis of the cylinder.

* * * * *